United States Patent
Karanjkar et al.

(10) Patent No.: US 12,273,184 B2
(45) Date of Patent: Apr. 8, 2025

(54) REMOTE MULTICHANNEL AUDIO AND VIDEO MONITORING AND DIAGNOSTICS FOR BROADCAST SIGNALS

(71) Applicant: Wohler Technologies, Inc., Hayward, CA (US)

(72) Inventors: Makarand Karanjkar, Kenmore, WA (US); Amol V Natekar, Fremont, CA (US)

(73) Assignee: Wohler Technologies, Inc., Hayward, CA (US)

( * ) Notice: Subject to any disclaimer, the term of this patent is extended or adjusted under 35 U.S.C. 154(b) by 115 days.

(21) Appl. No.: 18/063,317

(22) Filed: Dec. 8, 2022

(65) Prior Publication Data
US 2023/0188234 A1 Jun. 15, 2023

Related U.S. Application Data

(60) Provisional application No. 63/287,946, filed on Dec. 9, 2021.

(51) Int. Cl.
*H04N 21/24* (2011.01)
*H04H 20/12* (2008.01)
*H04H 20/61* (2008.01)

(52) U.S. Cl.
CPC ............ *H04H 20/12* (2013.01); *H04H 20/61* (2013.01); *H04N 21/2407* (2013.01)

(58) Field of Classification Search
CPC .......................... H04N 21/2407; H04H 20/12
USPC ......................................................... 725/107
See application file for complete search history.

(56) References Cited

U.S. PATENT DOCUMENTS

| 6,523,175 | B1 | 2/2003 | Chan |
| 2006/0211416 | A1 | 9/2006 | Snyder et al. |
| 2009/0179989 | A1* | 7/2009 | Bessone ................. H04B 17/24 348/192 |

(Continued)

FOREIGN PATENT DOCUMENTS

| KR | 20090010490 A | * | 7/2007 |
| KR | 20120057178 A | * | 11/2010 |
| WO | 2005025217 A1 | | 3/2005 |

OTHER PUBLICATIONS

V. Bajpai and J. Schönwälder, "A Survey on Internet Performance Measurement Platforms and Related Standardization Efforts," in IEEE Communications Surveys & Tutorials, vol. 17, No. 3, pp. 1313-1341, third quarter 2015, doi: 10.1109/COMST.2015.2418435 (Year: 2015).*

(Continued)

*Primary Examiner* — Cynthia M Fogg
(74) *Attorney, Agent, or Firm* — Lowenstein Sandler LLP; Madhumita Datta

(57) ABSTRACT

Remote handling of signal integrity is described. Specifically, remote monitoring of audio and video signals for multiple broadcast channels is described. The goal of the described remote monitoring system is to be a single point solution for a broad range of monitoring needs for the customer. As a result, the solution described here can scale across a broad range of signals that needs to be monitored from any physical locations across the globe. The remote monitoring system comprises a plurality of probes, various backend servers and user interface for dedicated personnel to ensure compliance of signals with broadcast standards.

20 Claims, 12 Drawing Sheets

(56) References Cited

U.S. PATENT DOCUMENTS

| | | | |
|---|---|---|---|
| 2010/0324855 A1* | 12/2010 | Parker | G06F 11/2294 |
| | | | 715/700 |
| 2013/0067109 A1* | 3/2013 | Dong | H04L 43/08 |
| | | | 709/231 |
| 2014/0304367 A1 | 10/2014 | Fletcher | |
| 2015/0304196 A1 | 10/2015 | Sun et al. | |
| 2016/0094371 A1* | 3/2016 | Hong | H04L 41/22 |
| | | | 375/376 |
| 2016/0302093 A1* | 10/2016 | Fuller | H04H 20/12 |
| 2019/0149815 A1* | 5/2019 | Tran | H04N 17/045 |
| | | | 725/16 |
| 2019/0166361 A1* | 5/2019 | De La Paz | H04N 7/15 |
| 2019/0207689 A1 | 7/2019 | Fuller et al. | |

OTHER PUBLICATIONS

PCT International Search Report and Written Opinion for International Application No. PCT/US2022/041592 mailed Mar. 16, 2023, 23 pages.

\* cited by examiner

REMOTE MULTICHANNEL AUDIO AND VIDEO MONITORING AND DIAGNOSTICS FOR BROADCAST SIGNALS

RELATED APPLICATIONS

This application is related to and claims the benefit of U.S. Provisional Patent Application No. 63/287,946, filed Dec. 9, 2021, titled "Remote Multichannel Audio and Video Monitoring and Diagnostics for Broadcast Signals," the entirety of which is incorporated herein by reference.

TECHNICAL FIELD

This application relates to remote handling of signal integrity in general, and remote monitoring of audio and video signals for multiple broadcast channels in particular.

BACKGROUND

The broadcast industry has three functional vertical areas of operation, as shown in FIG. 1, namely, Contribution (102), Production (104) and Distribution (106). Contribution is the operational area where various kinds of audio and video contents originate. For example, the operational area could be a live recording studio, a live sports event in a stadium (where signals are captured in an Onsite Broadcast Vehicle—OBV) or any other event occurring anywhere, where one or more cameras and microphones are used to capture content. Contribution is also the operational area where the captured content is sent along to Production, which is the next vertical. Production is where directorial decisions regarding selection of cameras, locations as well as rendering of shots are made. From Production, one or more master signals, which are the outcome of production decisions, are sent into the Distribution vertical. Distribution is where the master signal(s) are prepared for distribution for ultimate consumption by end customers, who consume the programming on TV, mobile phones or tablets etc.

Corresponding to each of the above indicated verticals, a typical broadcast facility, as shown in FIG. 2, has a Production Control Room (PCR) (202), a Master Control Room (MCR) (204) and a Transmission Control Room (TCR) (206). In addition to the above, there may be an operational area (203) to record live programs, and playback pre-recorded programs. Played back programs along with live programs enter the MCR, where they are quality checked across multiple dimensions, and passed into the TCR for final transmission.

Each of these functional areas, the PCR, MCR and TCR have multiple audio and video signals flowing through them. There exists a plurality of signal types in the audio and video domains. These audio and video signals can be uncompressed or compressed to varying degrees depending upon the demands of any situation. As an example, signals flowing from Contribution to Production may be only slightly (or not) compressed, to preserve incoming signal quality, and potentially to save upon the cost of transmission. Within broadcast facilities in the PCR and MCR, signals are typically uncompressed until they flow into the TCR. Within the TCR, signals are fully compressed for final transmission to end customers, whose various playback devices will uncompress the signals at the time of playback.

Given the enormous complexity of signal flow due to a significant expansion in the number of transmitted channels and overall growth in content, and the fact that no two facilities are identical, there is a perpetual need to continuously monitor the quality and compliance of these signals across all verticals, at various points in the PCR, MCR and TCR. A fault in the flow of signals must be quickly identified, root caused and fixed to ensure a high-quality experience for consumers of the content. Sometimes, at critical points in time, for example in emergency broadcasts, these requirements become even more acute.

In addition to the fact that the broadcast industry is considered "mission critical" to functioning of a country, the impact of the recent pandemic has imposed additional requirements for remote work, and management of these functions. Further, the sheer number of signals that now need to be monitored makes it impractical for individual operators to realistically monitor them manually.

The present inventors have recognized the need for automated remote monitoring of broadcast signals and provided a solution in the form of a scalable system that helps take appropriate action from anywhere in the world when signal integrity is compromised.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Remote handling of signal integrity is described. Specifically, remote monitoring of audio and video signals for multiple broadcast channels is described. The goal of the described remote monitoring system is to be a single point solution for a broad range of monitoring needs for the customer. As a result, the solution described here can scale across a broad range of signals that needs to be monitored from any physical locations across the globe. The remote monitoring system comprises a plurality of probes, various backend servers and user interface for dedicated personnel to ensure compliance of signals with broadcast standards.

More particularly, aspects of the disclosure describe a system for remotely monitoring integrity of a plurality of broadcast signals, the system comprising: on-premise equipment that receives a plurality of incoming content signals and processes the plurality of incoming content signals for eventually being converted into the plurality of broadcast signals; a plurality of probes operatively coupled with the on-premise equipment, wherein the plurality of probes inspect whether the plurality of incoming content signals are processed into signals that are compliant with a broadcast standard, wherein each probe or each group of probes corresponds to a respective subset of processed signals; an event server that, upon receiving notification from any of the probes of occurrence of an event indicating non-compliance of one or more processed signals with the broadcast standard, selectively sends an alert to dedicated personnel responsible for ensuring integrity of a specific subset of processed signals, wherein the event server is at a first remote location with respect to the on-premise equipment; a user interface server at the first remote location that, upon receiving the alert, generates user interface elements to enable the dedicated personnel to make corrections to the one or more processed signals within the specific subset of broadcast signals, such that the corrected signals are compliant with the broadcast standard; and, a communications server at the first remote location that provides an integrated communications channel which enables the dedicated personnel to communicate audio-visually to make the corrections to the one or more processed signals, wherein the dedicated personnel is at a second remote location with respect to the first remote location.

The first remote location may be in the cloud. The second remote location where the dedicated personnel is physically located may be anywhere in the world irrespective of the location of the content signal origination premise.

The on-premise equipment may include incoming content signal receiver, incoming content signal characteristic monitor, a local area network, and a router to transmit the processed signals to the first remote location.

The system includes a streaming server which is either partially located on-premise or located at the first remote location, wherein the streaming server transmits processed signals to the user-interface server.

Dedicated personnel at the second remote location, which can be anywhere in the world, uses a user device to make the corrections to the one or more processed signals.

The incoming content signal can be an uncompressed audio signal, video signal or audio-visual signal in analog or digital format, or can be compressed using various codecs.

In some embodiments, the plurality of probes may monitor the incoming content signals by exception, such that inspection of the incoming content signal is continuous and automated, but a notification is sent to the event server only when one or more characteristics of the incoming content signal does not meet the predetermined broadcast standard at the time of inspection.

The communications server enables audio, visual or audio visual communication via the user interface elements over a dedicated channel (also called integrated communications channel) that is connected to respective user devices of respective groups of dedicated personnel responsible for ensuring integrity of respective specific subsets of processed signals.

In various embodiments, data sent to the event server by the probes include one or more of: asynchronous event data, synchronous event data, metadata and signal data etc. In an embodiment, the asynchronous event data includes one or more of: error indication resulting from audio silence or absence of video, clock or sampling rate change, audio loudness threshold crossing, reversed phrasing, packet loss, input/output errors, transmit/receive discards, collisions, frozen video, link loss, synchronization loss, video resolution change etc.

In various embodiments, the plurality of probes is implemented on rack-mounted hardware monitor, non-monitor dedicated hardware or as software executing on a probe server. The probe server may be a virtual machine deployed on-premise or in the first remote location.

The plurality of probes can be grouped into respective subsets of probes, each subset of probes monitoring a corresponding subset of channels of incoming content signals. The plurality of probes can be grouped by types of incoming content signal being monitored, and/or physical location of incoming content signal being monitored.

In some embodiments, additional sets of probes can be installed at intermediate links in a path of the plurality of broadcast signals or at a final destination of the plurality of broadcast signals. In these embodiments, signal loss or impairment is detected by combining data generated by the plurality of probes coupled with the on-premise equipment and data generated by the second set of probes.

In an aspect of the present disclosure, the probes are configurable. For example, each of the plurality of probes, or a subset of probes, is user configurable to suit different predetermined broadcast standards.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to a system for remotely monitoring integrity of a plurality of broadcast signals. One embodiment of the remote monitoring system is described as "Multichannel Audio Video Remote Integration & Control (MAVRIC)" system, though this disclosure generically broadly encompasses various embodiments that can be modifications of the MAVRIC system, as described below. The goal of remote monitoring system is to be a single point solution for a broad range of monitoring needs for the customer. As a result, the solution can scale across a broad range of signals that needs to be monitored any physical locations across the globe.

As described in the background section, the content signals can be of various types, including compressed or uncompressed audio, video and/or audio-visual signals. Examples of uncompressed audio signals are Analog, MADI, AES, SDI, AoIP, ST2022-6/7, ST2110-30 among others. Examples of uncompressed video signals are SDI, ST2110, ST2022-6/7 and CVBS amongst others. Examples of audio and video compressed signals using various codecs (Encoder-Decoder) are MPEG2, MPEG4, H.264 and HEVC amongst many more. These signals, both compressed and uncompressed, are transmitted within the facility and outside it over physical media like copper cables, optical fiber, or over radio frequency channels including satellite transmissions, specifically built with specifications demanded by any given signal.

Figure 1:
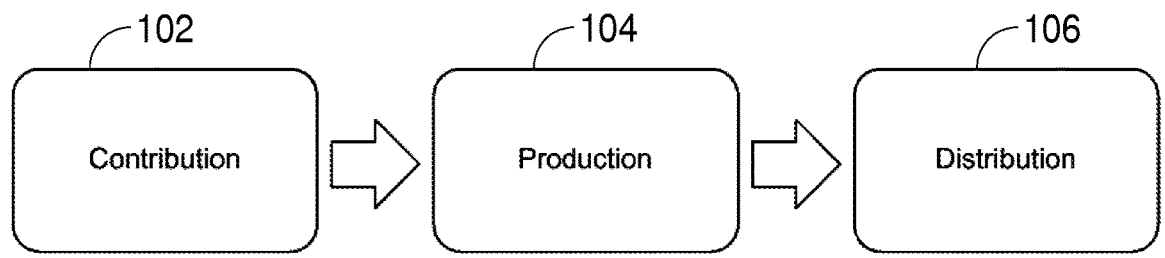
FIG. 1 illustrates the overall system context diagram showing broadcast functional verticals, according to an embodiment of the present disclosure.
Figure 2:
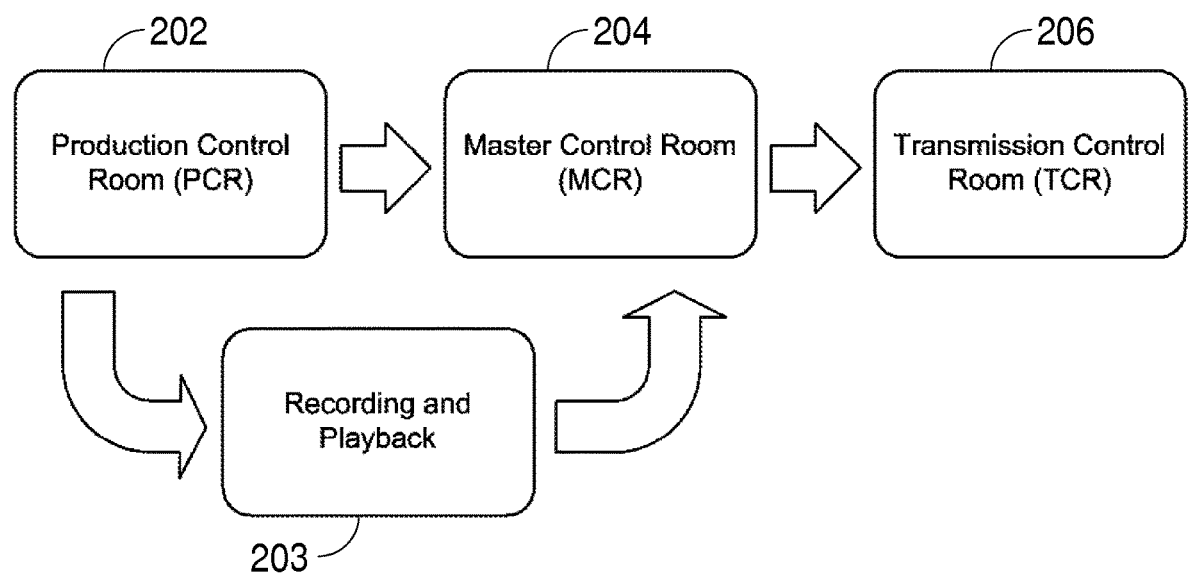
FIG. 2 illustrates the building blocks of broadcast facilities, according to an embodiment of the present disclosure.

The remote monitoring system provides many key features. First, it provides remote monitoring of multiple audio/video signals in various parts of the broadcast facilities, as shown in FIGS. 1 and 2. Second, the remote monitoring system enables more efficient utilization of operator manpower resources by following a "monitoring by exception" policy, which is implemented by continuous automated monitoring of preconfigured conditions that trigger alerts in the event of an exception. Thirdly, the remote monitoring system includes an integrated communications system that enables all personnel connected with monitoring a specific set of signals or alerts to communicate with each other conveniently over a dedicated and fully integrated channel, without having to resort to a communication channel external to the system.

The system scales globally and allows for remote monitoring of signals located anywhere in the world, across multiple User Interfaces and devices that could be located anywhere in the world served by the Internet. This allows the signal integrity of multiple broadcast channels to be monitored, quality checked and assured from remote locations outside of the broadcast facility.

Figure 3:
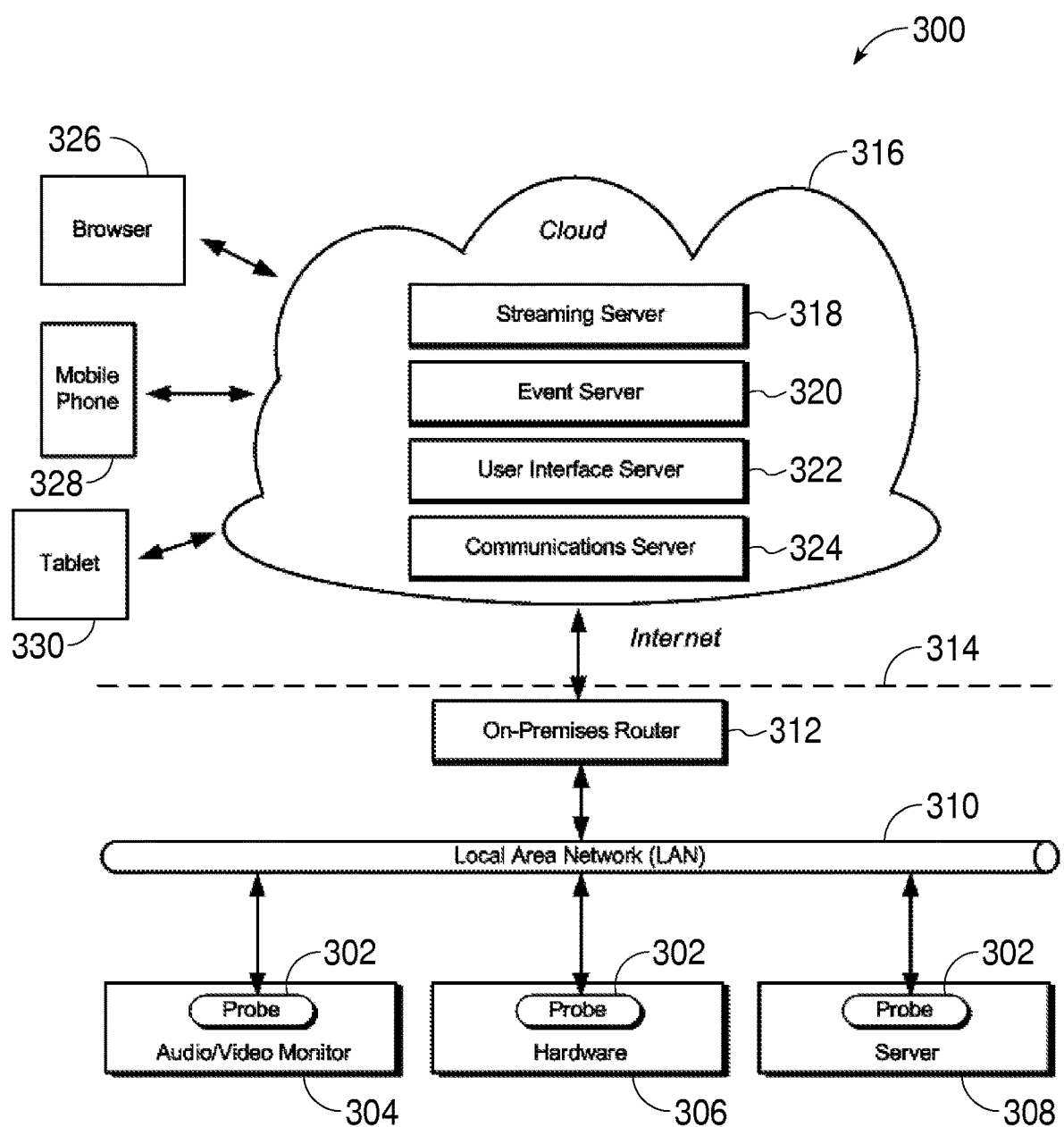
FIG. 3 illustrates components of the overall system, according to an embodiment of the present disclosure.

FIG. 3 illustrates components of the overall system 300, according to an embodiment of the present disclosure. The system 300 comprises three major elements: probes, a variety of backend servers, and a variety of user interfaces enabling personnel to take action to ensure that quality of broadcast signals meet predetermined broadcast standards. For example, to meet broadcast standards, signal may have to have a certain level of loudness within a range bound by a maximum value and a minimum value. For video signals, the resolution and frame rate need to meet certain quality threshold. For audio-visual signals, the synchronization between audio and video needs to maintain a quality threshold. Other examples related to quality of signal consumed by the end users are within the scope of this disclosure.

A probe is an entity that provides two core functions. Firstly, probes provide the ability to remotely monitor one or more audio and/or video signals along with related data like audible or perceptual quality, metering, and signal metadata, by compressing (if needed) and transmitting those signals and data to a back-end streaming server for further distribution. A probe can also receive a signal from a remote location, either directly over a Local Area Network (LAN) or via a back-end streaming server and render it locally, depending on the capabilities of the hardware on which the probe operates. A probe's key function is to monitor a set of audio and video signals (which may be of varying formats as discussed above) and transform them into a unified format that provides a consistent representation of those signals to remote users consuming that view across a plurality of devices like browsers (running on PC's or other devices), mobile apps, tablets etc. Secondly, a probe can be configured to continuously monitor specific events in the monitored audio or video signal and report those events to a backend event server for further processing to determine if an alert needs to be generated in response to the sequence and or occurrence of these events.

The system 300 in FIG. 3 shows on-premise equipment underneath the demarcation line 314 and remotely located system components above the line 314. The remote location can be a cloud 316. Probes 302 can be coupled with incoming content signal receiver, which can have an audio/video monitor 304 that monitors characteristics of the incoming content signal. Probes can run on special dedicated hardware 306 or probe server 308. Probes 302 send data to local area network (LAN) to transmit to the cloud 316 via on-premise router 312.

Cloud 316 may have various backend servers, such as, a streaming server 318, event server 320, user interface server 322 and communication server 324. The cloud 316 communicatively coupled to user device with browsers 326, mobile apps 328 or tablets 330. Note than in certain embodiments, one or both the streaming server and the event server could be deployed in the cloud 316 or on on-premise server (such as 308), or any combination thereof.

Non-limiting examples of data sent between the probe and the event server and/or the streaming server include:
Real time synchronous digital audio and/or video signals from each of the monitored channels,
Real time synchronous audio metering from each of the monitored channels,
Real Time audio and video perceptual quality data, either to or from the server,
Asynchronous event and or alarm data from the Audio/Video Monitor (e.g. 304), such as, but not limited to:
Error indication resulting from audio silence
Audio clock or sampling rate change
Audio loudness threshold crossed
Audible Remote Monitoring
Silence Detection
Reversed Phasing
Loudness Outside of Limits
Cyclic Redundancy Check (CRC) Errors (CRC data is embedded within digital signals, e.g., Dolby Digital signals, that are transmitted in the form of packets. CRC data is used to detect and possibly correct errors to ensure signal integrity)
For Internet Protocol (IP) based audio and video signal formats
Packet Loss
Input/Output Errors
Transmit/Receive Discards
Collisions
Video black
Frozen video
Video and MPEG link/sync loss
Video and MPEG clock or resolution change
MPEG bitrate info
Configuration information for setting up exactly what events and alarms are to be monitored, and
Heartbeat data indicating that the Audio/Video probe is operating normally. Heartbeat is a regular signal that is sent by the probe (potentially implemented as the MAVRIC interface of the Audio/Video monitor) to assure that it is running normally and that its data can be trusted. The lack of a heartbeat would indicate that there are operational problems with the probe and could also indicate a potential loss of communication with the probe.

Figure 4:
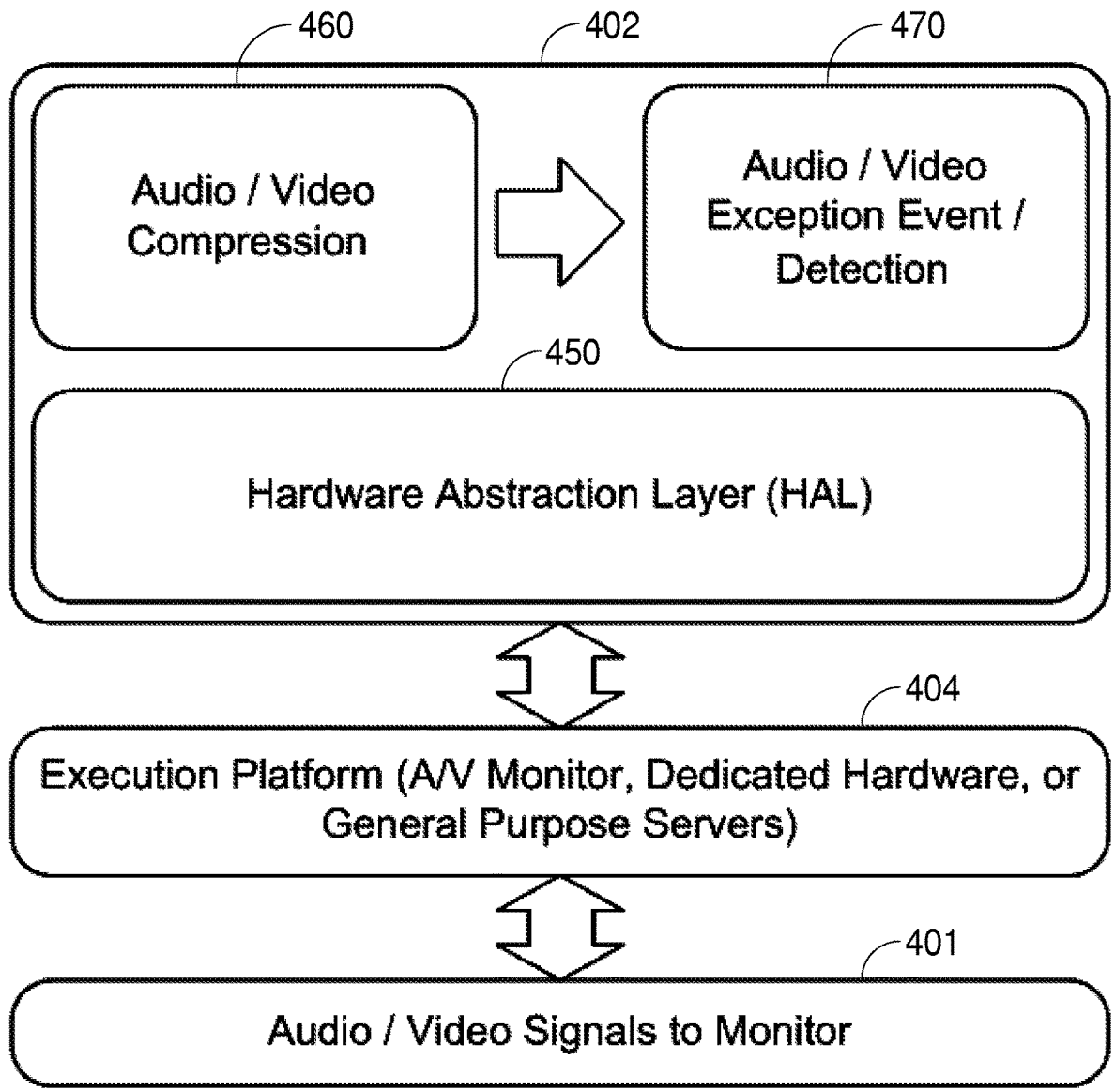
FIG. 4 illustrates probe architecture, according to an embodiment of the present disclosure.

FIG. 4 illustrates a probe architecture, according to an embodiment of the present disclosure. Probes 402 may be implemented to execute on an execution platform 404, which can be an audio/visual monitor (such as 304), dedicated rack-mounted hardware (such as 306), or as a software application executing on general purpose servers (such as 308), depending on the needs of any given situation. The execution platform 404 receives audio/video content signals

401 to monitor. A Hardware Abstraction Layer (HAL) 450 that is specific to the execution platform 404, allows for a generalization of the features of the probe, making them agnostic to implementation of the probe to execute on dedicated hardware or general-purpose servers deployed on-premise or in the Cloud.

In various embodiments, a probe could therefore be implemented on an audio/video rack-mounted hardware monitor, on a hardware implementation that is not a monitor, or as software running on a Virtual Machine (VM) server, that could be deployed on an on-premises server or in the Cloud. Probe 402 may have a module 460 with the ability to compress audio/video content signals and a module 470 with the ability to send data to streaming server/event server based on event detection mechanism, such as, event detection by exception, where the inspection of the incoming content signal is continuous and automated, but a notification is sent to the event server only when one or more characteristics of the incoming content signal does not meet the predetermined broadcast standard at the time of inspection.

Probes can be of different types. One manner in which probe types are classified can be by the kind of signal they are designed to monitor. Examples are:

Audio Only Probe: This type would monitor any number of channels (for example, 2, 4, 8, 16, 32 or more channels) of audio and metering across any signal and transport type that it is configured for.

Audio and Video Probe: This type would monitor any number of channels (for example, 2, 4, 8, 16, 32 or more channels) of audio and metering plus one or more channels of uncompressed video across any signal and transport type that it is configured for.

MPEG Video Probe: This type would decode MPEG video and monitor decoder metadata, up to a maximum number of channels, for example, 16 channels, of audio (including decoded audio), and one (or more) channels of decoded video across any signal and transport type that it is configured for.

Another way to classify probes would be to group them based on the geographical location where the content signal being monitored by the probe is generated.

Going back to FIG. 3, probes 302 from multiple Audio/Video Monitoring Products 304 are connected to a LAN 310. Audio and metering data are transmitted via the LAN 310, destined for the streaming server 318 and event server 320, which are in this embodiment installed in the Cloud 316.

Figure 5:
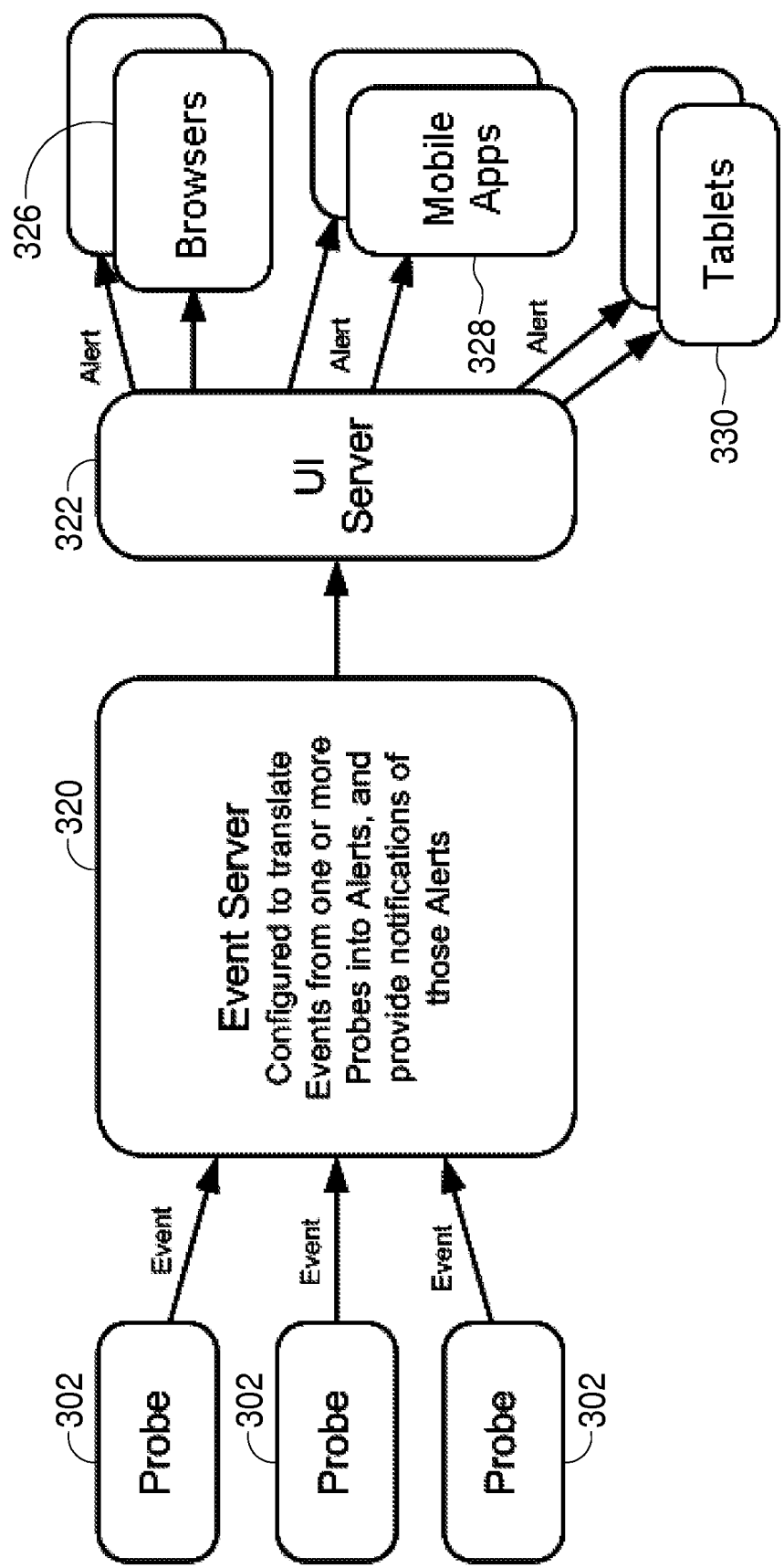
FIG. 5 illustrates event server architecture, according to an embodiment of the present disclosure.
Figure 6:
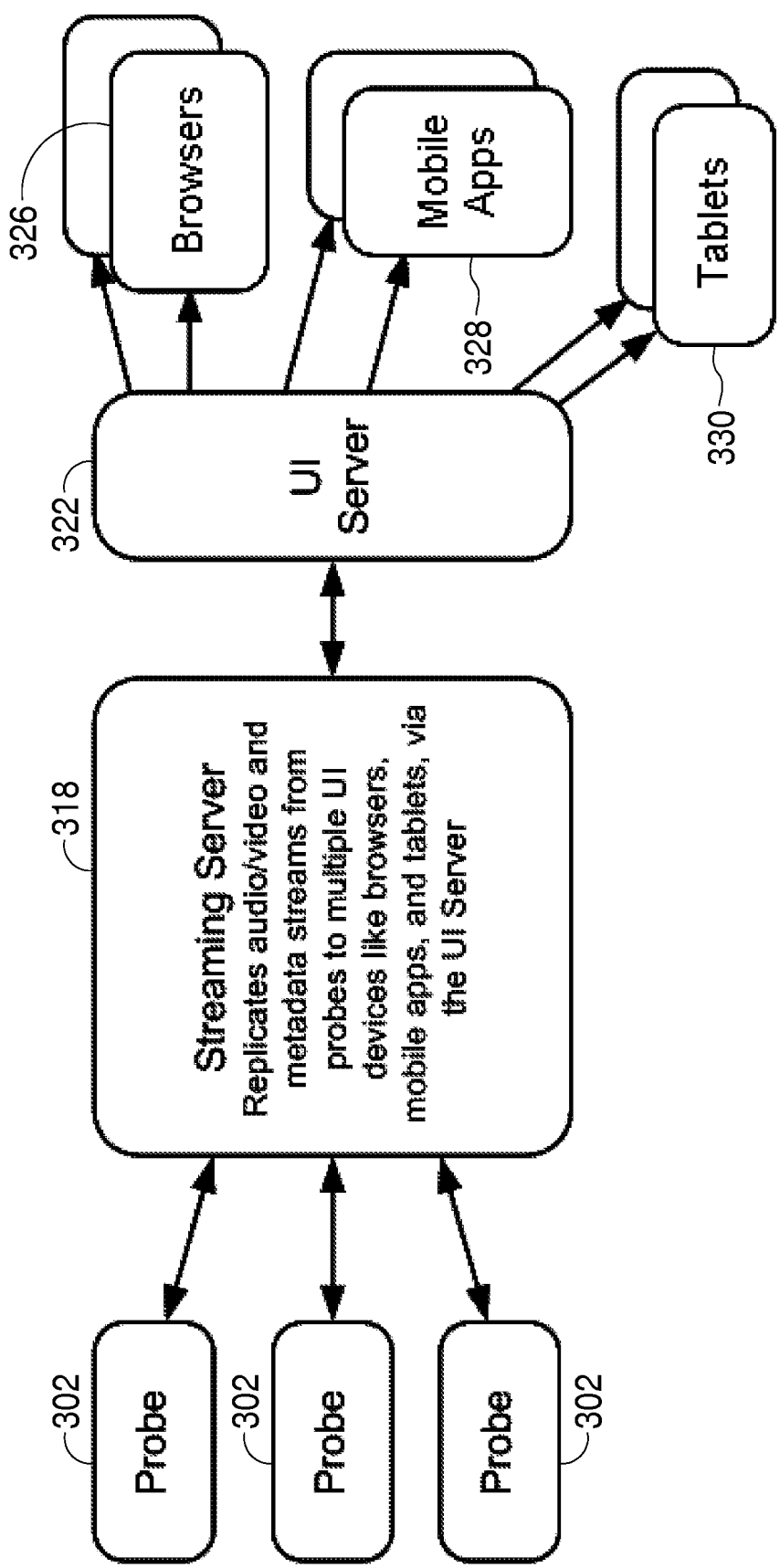
FIG. 6 illustrates streaming server architecture, according to an embodiment of the present disclosure.
Figure 7:
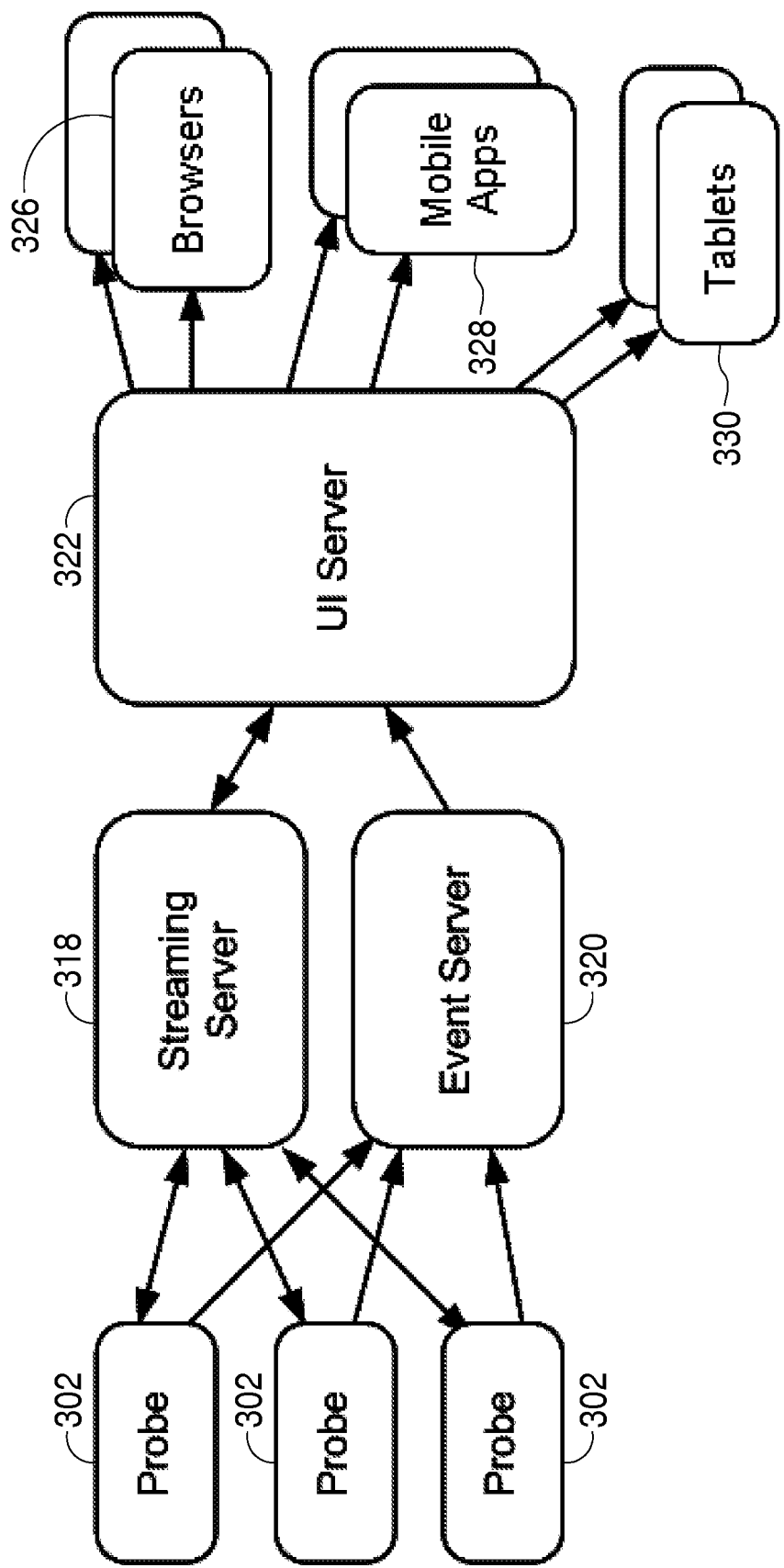
FIG. 7 illustrates user interface server architecture, according to an embodiment of the present disclosure.
Figure 8:
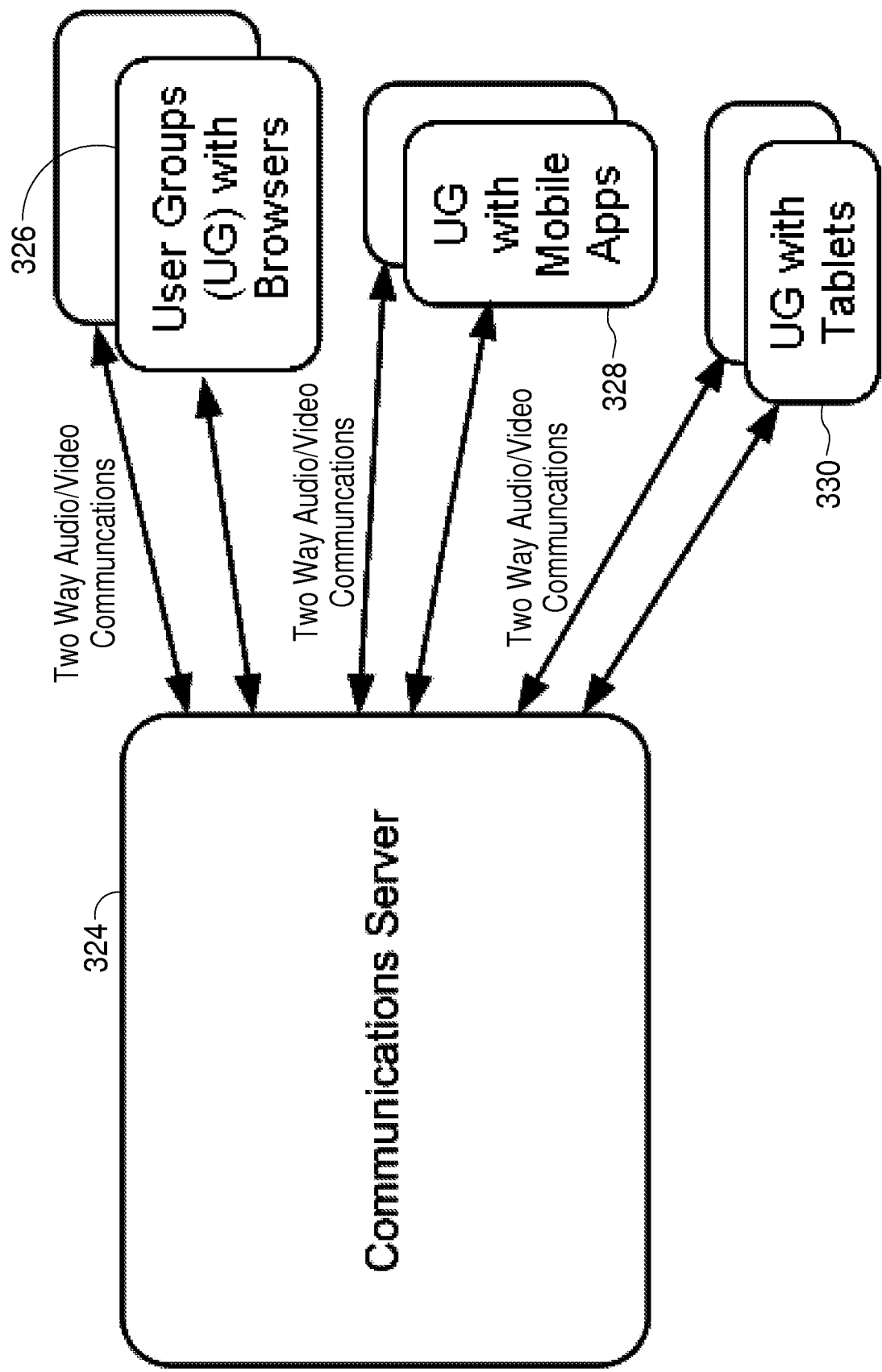
FIG. 8 illustrates user communications server architecture, according to an embodiment of the present disclosure.

FIGS. 5-8 show various backend servers that are usually at a remote location from the premise where content signal is received. The remote location could be Cloud. Software running across multiple backend servers is split across four functional blocks, used to achieve specific functionalities: event servers, streaming servers, UI servers, and communications servers, Specifically, FIG. 5 illustrates event server architecture. FIG. 6 illustrates streaming server architecture. FIG. 7 illustrates user interface server architecture. And FIG. 8 illustrates user communications server architecture.

An Event Server 320, shown in FIG. 5, receives real time events and alarms from various probes 302 (that may be installed anywhere in the world), interprets event data to determine if conditions to trigger an alert have been met, and if so, transmits alerts to a group of personnel registered to monitor the status and performance of signals associated with a specific group of probes. The alerts can be sent via email, SMS, pagers, mobile apps, or other mechanisms to the user device with browsers, mobile apps or tablets. One key and unique feature of this architecture is that a user could diagnose problems occurring in interconnection links spanning the world, by installing a probe at the source and another at an intermediate link along the signal path or at the destination of a signal, and combining the two to generate an alert if either reports signal loss or impairment. In short, event server facilitates setting up the desired monitoring parameters in the probe. It can also receive a "Heartbeat," which assures that the Audio/Video probe is operating normally. The event server also maintains records including but not limited to, a rolling record of errors or exceptions for any desired time period, and deletes old records beyond the desired time period.

A Streaming Server 318, shown in FIG. 6, receives compressed or uncompressed streams of audio, video, metering, and metadata from probes 302, or transmits these streams to the probes. The data may be real time or near real time. Streaming server may transmit these signals with or without further transformation, to a group of users consuming them across a plurality of user interface devices like browsers (running on PC's or other devices), mobile apps, tablets etc. Streaming server may simply replicate the signals received to the user interfaces of dedicated user groups (described below) or to other probes throughout the world.

A UI server 322, shown in FIG. 7, provide one or more services to present alerts, menus for probe configurations, alert configurations, user group configuration and management etc. A UI server may also provide "multiviewer interface" to enable viewing data/audio/video from multiple probes on a single customized interface displayed on user interface devices of a group of users consuming them across a plurality of user interface devices like browsers (running on PC's or other devices), mobile apps, tablets etc.

A Communications Server 324, shown in FIG. 8, facilitates communication between members of a specified group of users/operators. This specified group of users may be the dedicated personnel responsible for monitoring signal integrity of a specific set of content signals. Whenever an alert is generated by a system, it is delivered to this specific (e.g., a preconfigured group) group of users. If a user wishes to consult with other members within that group to quickly diagnose and resolve the cause underlying the generated alert, s/he can do so within the same UI where s/he is viewing the alert, directly without the need to contact the concerned people separately via another communication channel or mechanism. This deep contextual integration of communications between group members provides a smooth and more efficient path for resolution of matters specifically pertaining to resolution of root causes driving alerts within that group of users.

As mentioned above, the UI server links the data monitored by the event server to the UI of user group spread throughout the world. Examples of UI server functions include a degree of automation with the ability to set thresholds for any errors or exceptions, receive emails/messages/calls if errors or exceptions occur, and create and maintain of a log of errors or exceptions.

Figure 9:
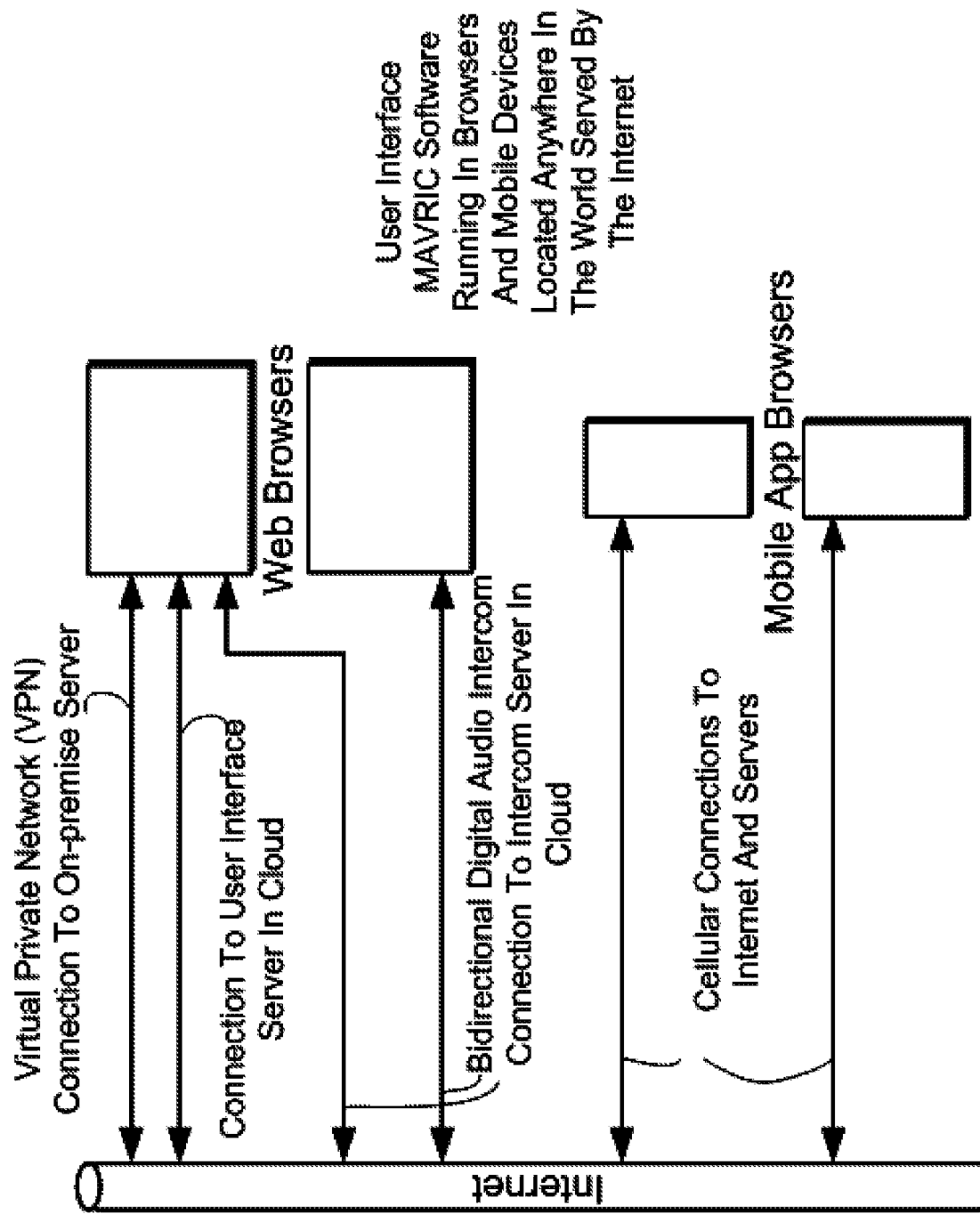
FIG. 9 illustrates user interfaces for personnel responsible for ensuring integrity of a specific subset of processed signals, according to an embodiment of the present disclosure.

FIG. 9 illustrates user interfaces for personnel responsible for ensuring integrity of a specific subset of processed signals, according to an embodiment of the present disclosure. Probes installed anywhere across the world, communicating with servers installed in the Cloud or on-premises, can be monitored by User Interfaces which may be located anywhere throughout the world via the Internet. Typical User Interfaces are as follows:

MAVRIC system software running in computers or laptops with a browser connected to the Internet, and Cellular phones or tablets with MAVRIC system software running on a mobile browser or mobile app, which is connected to the Internet.

The communications server can include an intercom that provides bidirectional voice connections between the UI so that the remote users can discuss the issues that may come up from their observations of the monitored signals. This can facilitate speedy corrective actions.

Figure 10:
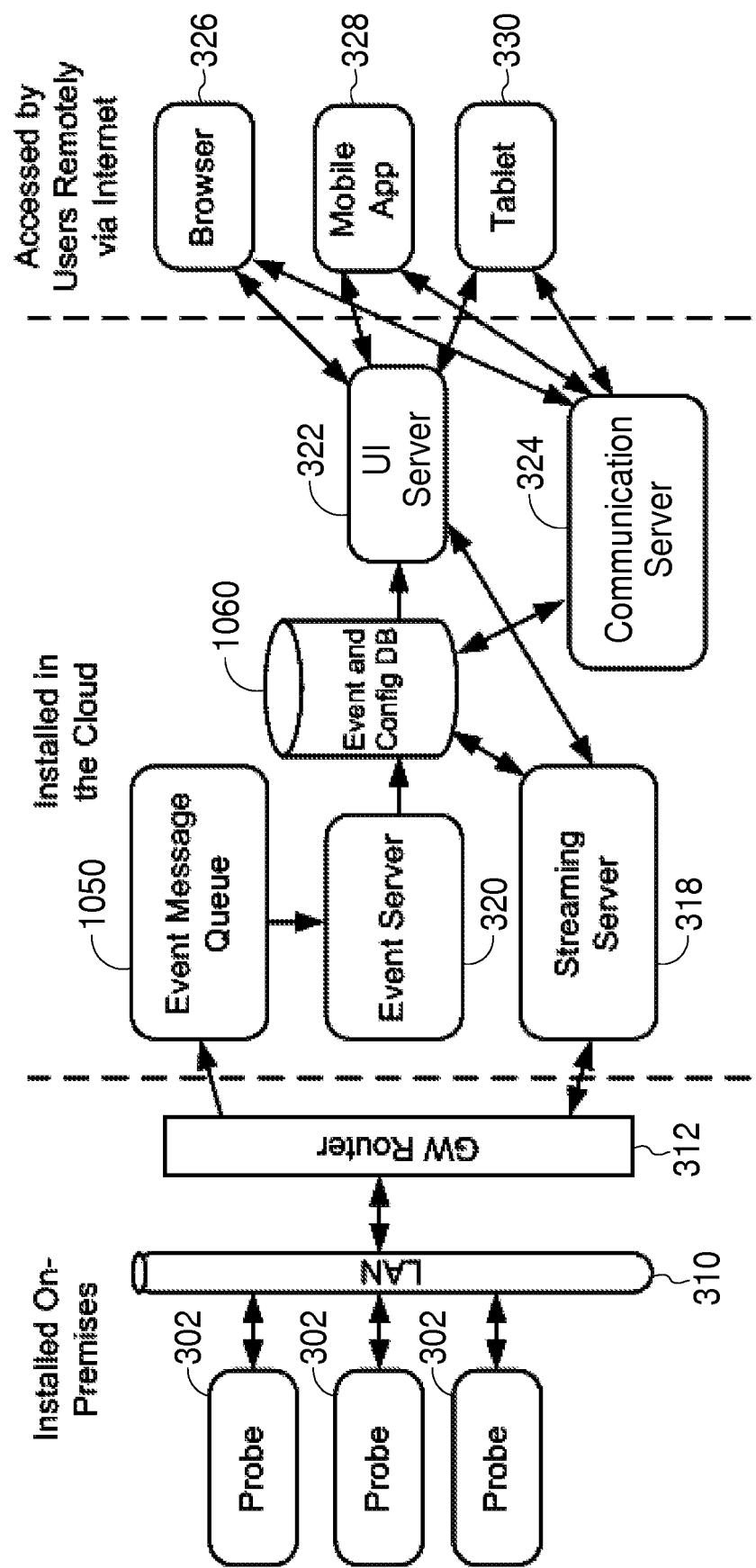
FIG. 10 illustrates one embodiment of system architecture for remote monitoring, according to an embodiment of the present disclosure.

FIG. 10 provides a detailed architectural view of the MAVRIC system from the on-premise equipment (e.g., Audio/Video Monitors) within the broadcast facilities to the remote User Interfaces worldwide that can monitor the signal integrity of the broadcast signals. Other than the components shown in FIG. 3, FIG. 10 shows an event message queue 1050 in the cloud that goes to the event server 320 to take action. An event log and configuration database 1060 is also in the cloud that is coupled to the event server, streaming server, UI server and the communications server.

Security of data, more specifically as applied to audio and/or video content signals, is paramount for customers of the MAVRIC system. Taking those concerns into account, the system has been designed to be entirely flexible in terms of deployment of applications. Each of the backend server components, i.e. the event server, streaming server, UI server and communications server described above can be deployed on on-premises servers or in the public Cloud like Amazon Web Services (AWS), Microsoft Azure, Google Cloud Platform (GCP), Digital Ocean and others, or any hybrid combination of those with some components on-premises and some in the Cloud.

Figure 11:
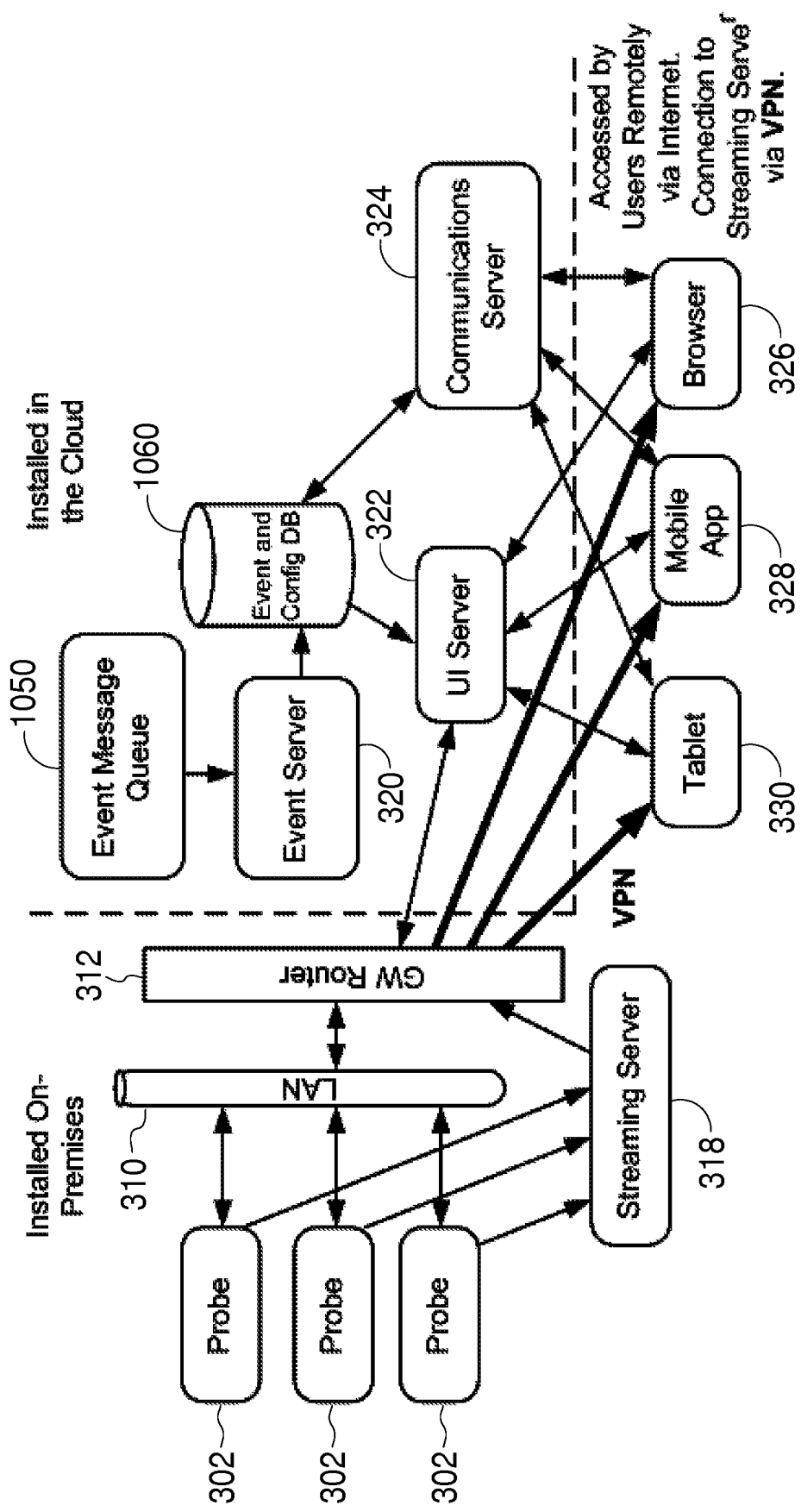
FIG. 11 illustrates another embodiment of system architecture for remote monitoring with an on-premise streaming server, according to an embodiment of the present disclosure.

FIG. 11 shows an alternative architecture where the streaming server 318 is on-premise rather than in the cloud. The UI server and the communications server in the cloud are connected to the user devices via internet, similar to FIG. 10. All services are accessed over an encrypted transport layer (HTTPS), and for components deployed on-premises, access to those services is limited to users who are logged into the on-premises network via the Virtual Private Networks (VPN) utilizing the gateway (GW) router.

In hybrid installations, where some components are deployed on-premises and some in the Cloud, connectivity between probes (which are typically installed on-premises), and services running in the Cloud is provided by specific firewall rules incorporated into on-premises routers to enable that traffic.

Figure 12:
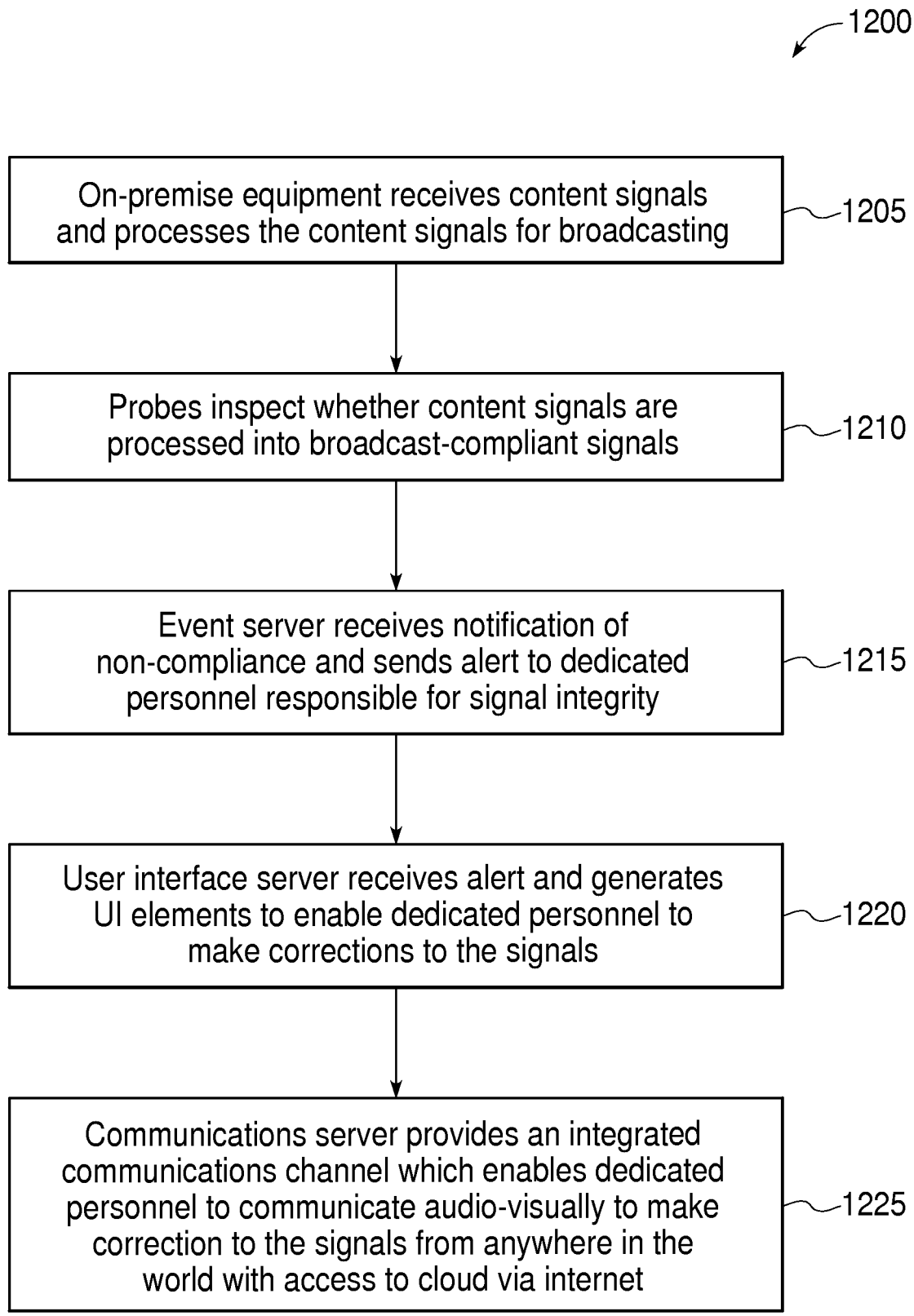
FIG. 12 illustrates a flowchart, according to an embodiment of the present disclosure.

FIG. 12 is a flow diagram of an example method 1200 to enable remote monitoring to ensure signal integrity, in accordance with some embodiments of the present disclosure. The method 1200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes in method 1200 or other methods described below with illustrative flowcharts can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Method 1200 starts at operation 1205, where on-premise equipment, such as audio/video monitor, receives a plurality of incoming content signals and processes the plurality of incoming content signals for eventually being converted into the plurality of broadcast signals.

At operation 1210, a plurality of probes, operatively coupled with the on-premise equipment, inspect whether the plurality of incoming content signals are processed into signals that are compliant with a broadcast standard, wherein each probe or each group of probes corresponds to a respective subset of processed signals.

At operation 1215, an event server receives notification from any of the probes of occurrence of an event indicating non-compliance of one or more processed signals with the broadcast standard, and selectively sends an alert to dedicated personnel responsible for ensuring integrity of a specific subset of processed signals, wherein the event server is at a first remote location, such as cloud.

At operation 1220, a user interface server at the cloud receives the alert, and generates user interface elements to enable the dedicated personnel to make corrections to the one or more processed signals within the specific subset of broadcast signals, such that the corrected signals are compliant with the broadcast standard.

At operation 1225, a communications server at the cloud provides an integrated communications channel which enables the dedicated personnel to communicate audio-visually to make the corrections to the one or more processed signals, wherein the dedicated personnel could be anywhere in the world, but can access the Cloud via Internet.

Figure 13:
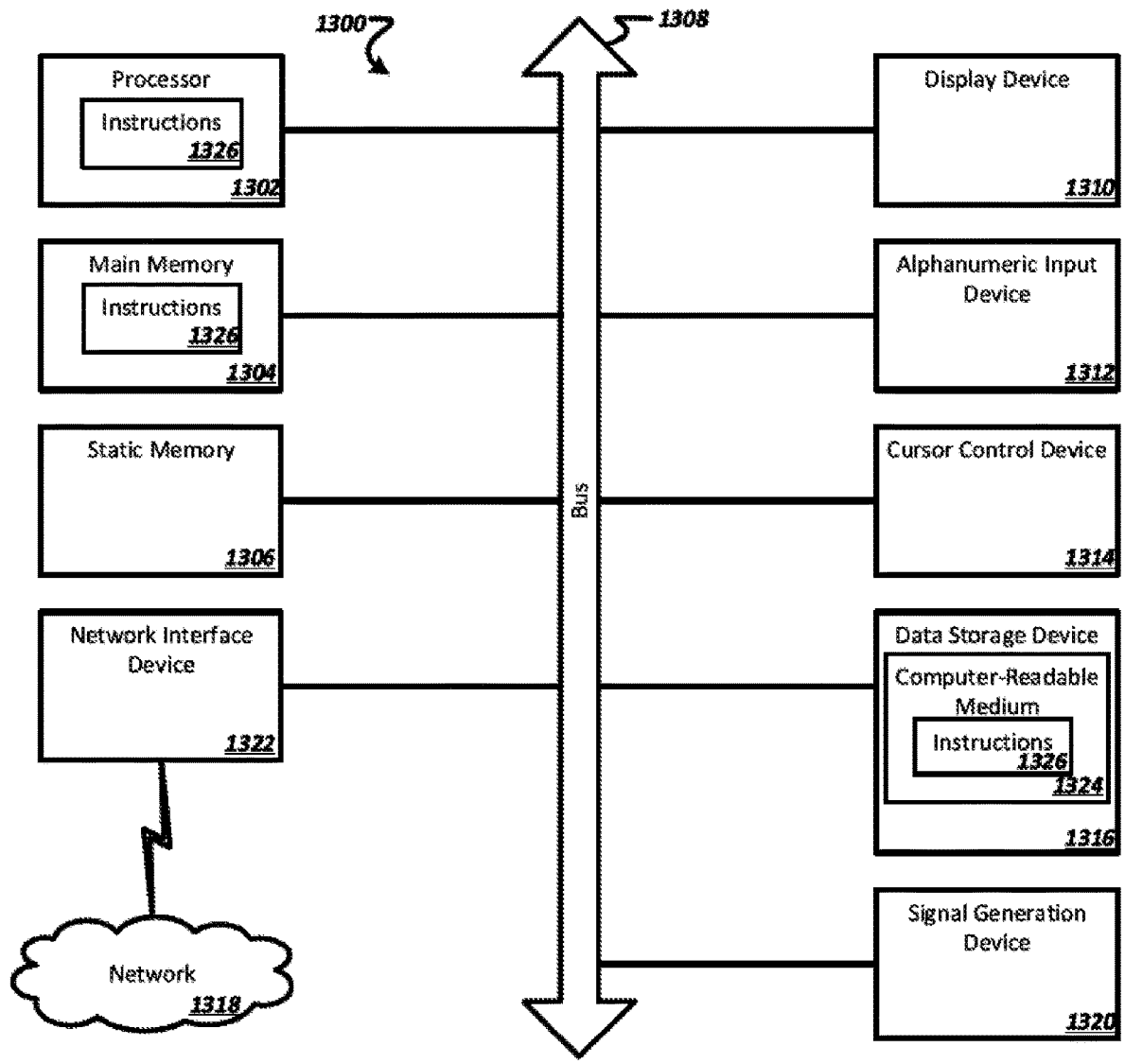
FIG. 13 shows a simplified computer environment within which the methods and systems of the present disclosure may be implemented.

FIG. 13 illustrates an example machine of a computer system 1300 within which a set of instructions 1326 for causing the machine to perform any one or more of the methodologies discussed herein (for example, at least some of the steps of the method 1200 in FIG. 12) may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a web appliance, a server, a network router, a switch or bridge, or any machine capable of executing a set of instructions 1326 (sequential or otherwise) that specify actions to be taken by that machine. Further, while a single machine is illustrated, the term "machine" shall also be taken to include any collection of machines that individually or jointly execute a set (or multiple sets) of instructions 1326 to perform any one or more of the methodologies discussed herein.

The example computer system 1300 includes a processing device 1302, a main memory 1304 (e.g., read-only memory (ROM), flash memory, dynamic random access memory (DRAM) such as synchronous DRAM (SDRAM) etc.), a static memory 1306 (e.g., flash memory, static random access memory (SRAM), etc.), and a data storage device 1316, which communicate with each other via a bus 1308.

Processing device 1302 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. The processing device 1302 is configured to execute instructions 1326 for performing the operations and steps discussed herein.

The computer system 1300 may further include a network interface device 1322 to communicate over the network 1318. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse or a touch pad), a signal generation device 1320 (e.g., a speaker), a graphics processing unit (not shown), video processing unit (not shown), and audio processing unit (not shown).

The data storage device 1316 may include a machine-readable storage medium 1324 (also known as a computer-readable medium) on which is stored one or more sets of instructions 1326 or software embodying any one or more of the methodologies or functions described herein. The instructions 1326 may also reside, completely or at least partially, within the main memory 1304 and/or within the processing device 1302 during execution thereof by the computer system 1300, the main memory 1304 and the processing device 1302 also constituting machine-readable storage media.

In one implementation, the instructions 1326 include instructions to implement functionality corresponding to a height difference determination. While the machine-readable storage medium 1324 is shown in an example implementation to be a single medium, the term "machine-readable storage medium" should be taken to include a single medium or multiple media (e.g., a centralized or distributed database, and/or associated caches and servers) that store the one or more sets of instructions 1326. The term "machine-readable storage medium" shall also be taken to include any medium that is capable of storing or encoding a set of instructions 1326 for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A system for remotely monitoring integrity of a plurality of broadcast signals, the system comprising:
   on-premise equipment that receives a plurality of incoming content signals and processes the plurality of incoming content signals for eventually being converted into the plurality of broadcast signals;
   a plurality of probes operatively coupled with the on-premise equipment, wherein the plurality of probes inspects whether the plurality of incoming content signals is processed into signals that are compliant with a predetermined broadcast standard, wherein each probe or each group of probes corresponds to a respective subset of processed signals, wherein the plurality of probes is implemented on a dedicated hardware or software executing on a probe server coupled with the on-premise equipment;

an event server that, upon receiving notification from any of the probes of occurrence of an event indicating non-compliance of one or more processed signals with the predetermined broadcast standard, selectively sends an alert to dedicated personnel responsible for ensuring integrity of a specific subset of processed signals, wherein the event server is at a first remote location with respect to the on-premise equipment;

a user interface server at the first remote location that, upon receiving the alert, generates user interface elements to enable the dedicated personnel to make corrections to the one or more processed signals within the specific subset of processed signals, such that the corrected signals are compliant with the predetermined broadcast standard; and a communications server at the first remote location that provides an integrated communications channel which enables the dedicated personnel to communicate to make the corrections to the one or more processed signals, wherein the dedicated personnel is at a second remote location with respect to the first remote location.

2. The system of claim 1, wherein the on-premise equipment includes one or more of: incoming content signal receiver, and incoming content signal characteristic monitor.

3. The system of claim 1, wherein the on-premise equipment includes a local area network, and a router to transmit the processed signals to the first remote location.

4. The system of claim 1, further comprising a streaming server which is either partially located on-premise or located at the first remote location, wherein the streaming server transmits processed signals to the user interface server.

5. The system of claim 1, wherein the first remote location is a cloud.

6. The system of claim 5, wherein the dedicated personnel at the second remote location uses a user device to make the corrections to the one or more processed signals, wherein the user device is communicatively coupled to the cloud.

7. The system of claim 1, wherein an incoming content signal of the plurality of content signals is an uncompressed audio signal, video signal or audio-visual signal in analog or digital format.

8. The system of claim 1, wherein the incoming content signal is either uncompressed or compressed using various codecs.

9. The system of claim 1, wherein the plurality of probes inspects the plurality of incoming content signals by exception, such that inspection of an incoming content signal of the plurality of content signals is continuous and automated, but a notification is sent to the event server only when one or more characteristics of the incoming content signal does not meet the predetermined broadcast standard at a time of inspection.

10. The system of claim 1, wherein the communications server enables audio, visual or audio-visual communication using the user interface elements over the integrated communications channel that is connected to respective user devices of respective groups of dedicated personnel responsible for ensuring integrity of respective specific subsets of processed signals.

11. The system of claim 1, wherein data sent to the event server by the probes include one or more of: asynchronous event data, synchronous event data, metadata and signal data.

12. The system of claim 11, wherein the asynchronous event data includes one or more of: error indication resulting from audio silence or absence of video, clock or sampling rate change, audio loudness threshold crossing, reversed phrasing, packet loss, input/output errors, transmit/receive discards, collisions, frozen video, link loss, synchronization loss, video resolution change.

13. The system of claim 1, wherein the dedicated hardware on which the plurality of probes is implemented is non-monitor dedicated hardware.

14. The system of claim 13, wherein the probe server is a virtual machine deployed on-premise or in the first remote location.

15. The system of claim 1, wherein the plurality of probes is grouped into respective subsets of probes, each subset of probes inspecting a corresponding subset of channels of incoming content signals.

16. The system of claim 1, wherein the plurality of probes is grouped by either or both of: types of incoming content signal being inspected, and physical location of incoming content signal being inspected.

17. The system of claim 16, wherein the types of incoming content signal include: audio only, video only, audio-visual, uncompressed or compressed audio or visual signal with metadata.

18. The system of claim 1, further comprising a second set of probes installed at an intermediate link in a path of the plurality of broadcast signals or at a final destination of the plurality of broadcast signals.

19. The system of claim 18, wherein signal loss or impairment is detected by combining data generated by the plurality of probes coupled with the on-premise equipment and data generated by the second set of probes.

20. The system of claim 1, wherein the each of the plurality of probes is user configurable to suit different predetermined broadcast standards.

* * * * *